(12) United States Patent
Besler

(10) Patent No.: US 12,529,411 B2
(45) Date of Patent: Jan. 20, 2026

(54) ADAPTER APPARATUS FOR A TRAILER JACK

(71) Applicant: Roland Besler, Cambridge, NE (US)

(72) Inventor: Roland Besler, Cambridge, NE (US)

(*) Notice: Subject to any disclaimer, the term of this patent is extended or adjusted under 35 U.S.C. 154(b) by 299 days.

(21) Appl. No.: 18/386,471

(22) Filed: Nov. 2, 2023

(65) Prior Publication Data

US 2025/0146556 A1 May 8, 2025

(51) Int. Cl.
*B60S 9/04* (2006.01)
*F16H 1/32* (2006.01)

(52) U.S. Cl.
CPC . *F16H 1/32* (2013.01); *B60S 9/04* (2013.01)

(58) Field of Classification Search
CPC ..................................... F16H 1/32; B60S 9/04
See application file for complete search history.

(56) References Cited

U.S. PATENT DOCUMENTS

| | | | | |
|---|---|---|---|---|
| 3,951,383 A * | 4/1976 | Tenney, Jr. | ............... | B60S 9/04 254/94 |
| 5,050,845 A * | 9/1991 | Aline | ........................ | B60S 9/12 254/419 |
| 5,897,121 A | 4/1999 | Case | | |
| 6,099,016 A * | 8/2000 | Peveler | .................... | B60S 9/08 254/419 |
| 7,036,847 B2 * | 5/2006 | Alguera | .................... | B60S 9/08 280/765.1 |
| 11,332,102 B2 * | 5/2022 | LaHousse | ................. | B60S 9/08 |
| 2006/0097235 A1 * | 5/2006 | Wu | .......................... | B66F 3/12 254/126 |
| 2014/0183429 A1 * | 7/2014 | Conaway | .................. | B60S 9/10 74/25 |
| 2015/0197127 A1 * | 7/2015 | Magestro | ................. | B60S 9/18 173/217 |
| 2019/0031157 A1 * | 1/2019 | Sun | .......................... | B60S 9/04 |
| 2019/0061707 A1 * | 2/2019 | Raymond, Sr. | ........... | B60S 9/04 |
| 2020/0377062 A1 * | 12/2020 | Beik | ......................... | B60S 9/06 |
| 2022/0169211 A1 | 6/2022 | Bedel | | |
| 2022/0355769 A1 * | 11/2022 | MacDonald | ........ | B25B 13/5091 |
| 2023/0093116 A1 * | 3/2023 | LaHousse | ................. | B60S 9/08 280/766.1 |
| 2024/0166169 A1 * | 5/2024 | Jusick | ....................... | B60S 9/04 |
| 2025/0146556 A1 * | 5/2025 | Besler | ....................... | B60S 9/08 |
| 2025/0282330 A1 * | 9/2025 | Eifert | ........................ | B60S 9/22 |
| 2025/0305564 A1 * | 10/2025 | Ruiz-Mangi | ............. | B60S 9/04 |

* cited by examiner

*Primary Examiner* — Erez Gurari

(57) ABSTRACT

An adapter apparatus for connecting a rotary drive to a trailer jack includes an inline gear reducer has an input shaft and an output shaft which are aligned with each other along a rotational axis and face opposite directions from each other. The inline gear reducer is configured to urge the output shaft to rotate at a reduced rotational speed compared to an input rotational speed of the input shaft. A handle is coupled to and extends radially away from the inline gear reducer. The handle includes a grip adjacent to a distal end of the handle with respect to the inline gear reducer. A connector is removably couplable to the output shaft. The connector defines a reducer opening and a jack opening on opposite sides of the connector from each other. The reducer opening receives the output shaft of the inline gear reducer when the connector is coupled to the output shaft. The jack opening has a size and shape such that the jack opening is configured to receive a crank shaft of the trailer jack, and the connector is configured to coupled to the crank shaft.

7 Claims, 6 Drawing Sheets

ADAPTER APPARATUS FOR A TRAILER JACK

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to trailer jack adapters and more particularly pertains to a new trailer jack adapter for connecting a rotary drive to a trailer jack.

(2) Description of Related Art Including Information Disclosed Under 37 CFR 1.97 and 1.98

The prior art discloses myriad examples of trailer jack adapters for connecting a rotary drive to a trailer jack to operate the trailer jack via the rotary drive. However, the prior art fails to describe such an adapter which uses an inline gear reducer, a connector for connecting the inline gear reducer to a crank shaft of the trailer jack, and a radially protruding handle such that a user may grasp the handle and operate a drill or other rotary drive in engagement with the inline gear reducer to operate the trailer jack. Such an adapter is advantageous over the prior art because it allows the user to operate the trailer jack using the rotary drive while holding the adapter apparatus in an ergonomic position. Such a handle provides leverage by facilitating the user in resisting any unwanted rotation of the apparatus by holding the inline gear reducer from a distance via the handle.

BRIEF SUMMARY OF THE INVENTION

An embodiment of the disclosure meets the needs presented above by generally comprising an inline gear reducer has an input shaft and an output shaft which are aligned with each other along a rotational axis and face opposite directions from each other. The inline gear reducer is configured to urge the output shaft to rotate at a reduced rotational speed compared to an input rotational speed of the input shaft. A handle is coupled to and extends radially away from the inline gear reducer. The handle includes a grip adjacent to a distal end of the handle with respect to the inline gear reducer. A connector is removably couplable to the output shaft. The connector defines a reducer opening and a jack opening on opposite sides of the connector from each other. The reducer opening receives the output shaft of the inline gear reducer when the connector is coupled to the output shaft. The jack opening has a size and shape such that the jack opening is configured to receive a crank shaft of the trailer jack, and the connector is configured to coupled to the crank shaft.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
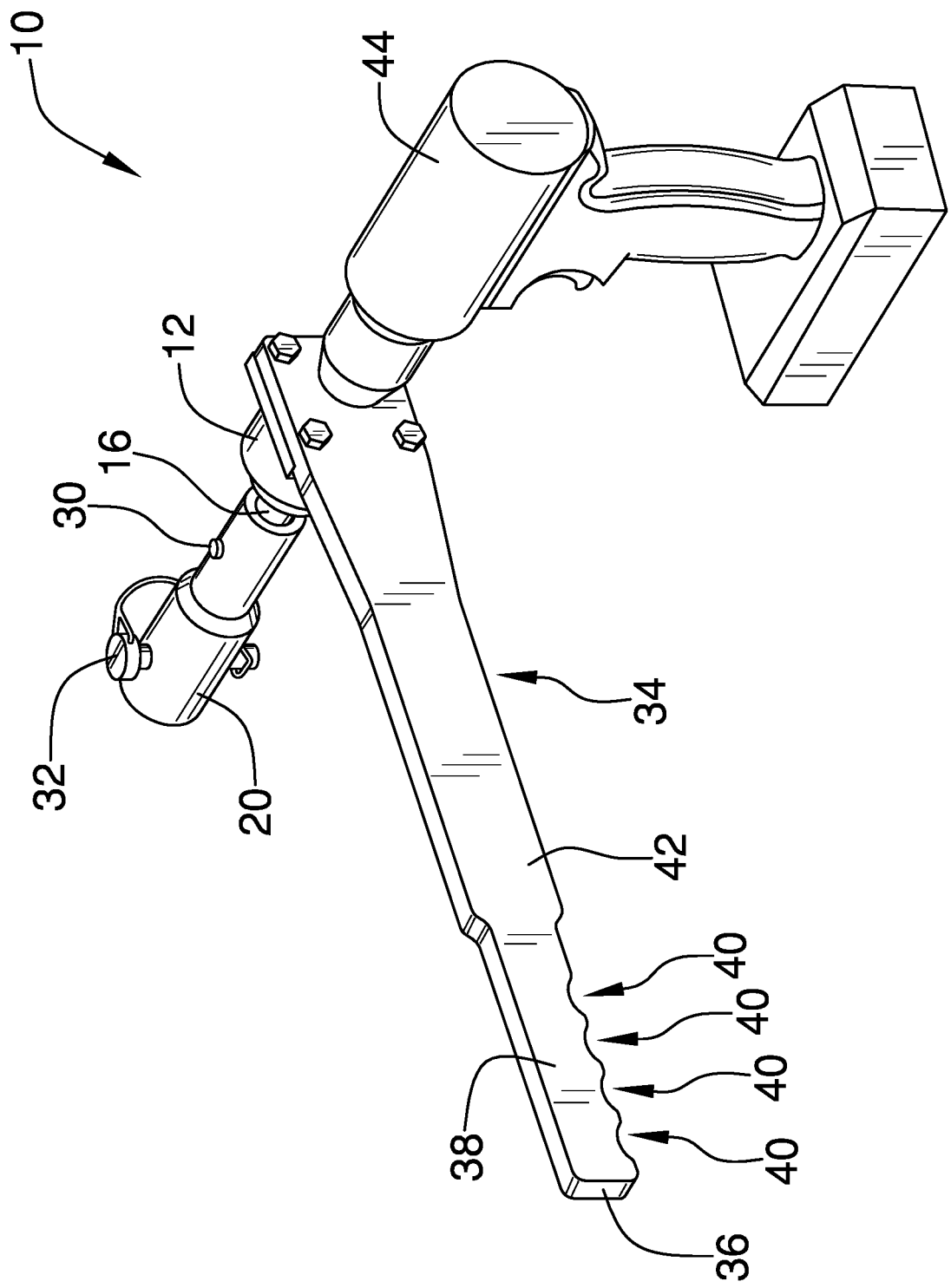
FIG. 1 is a perspective view of an adapter apparatus according to an embodiment of the disclosure in engagement with a rotary drive.
Figure 2:
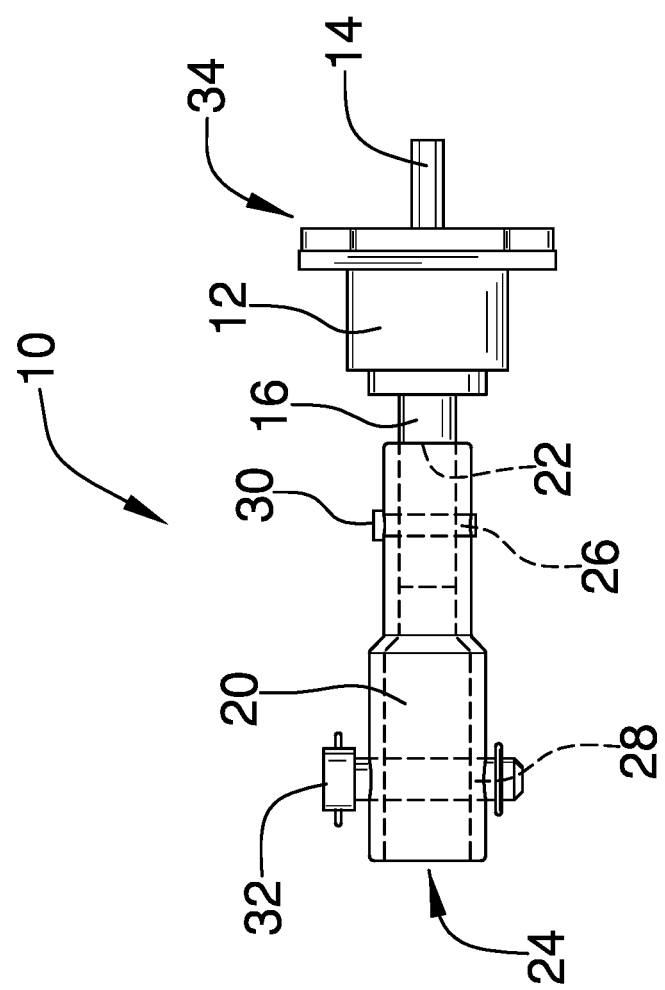
FIG. 2 is a side view of an embodiment of the disclosure.
Figure 3:
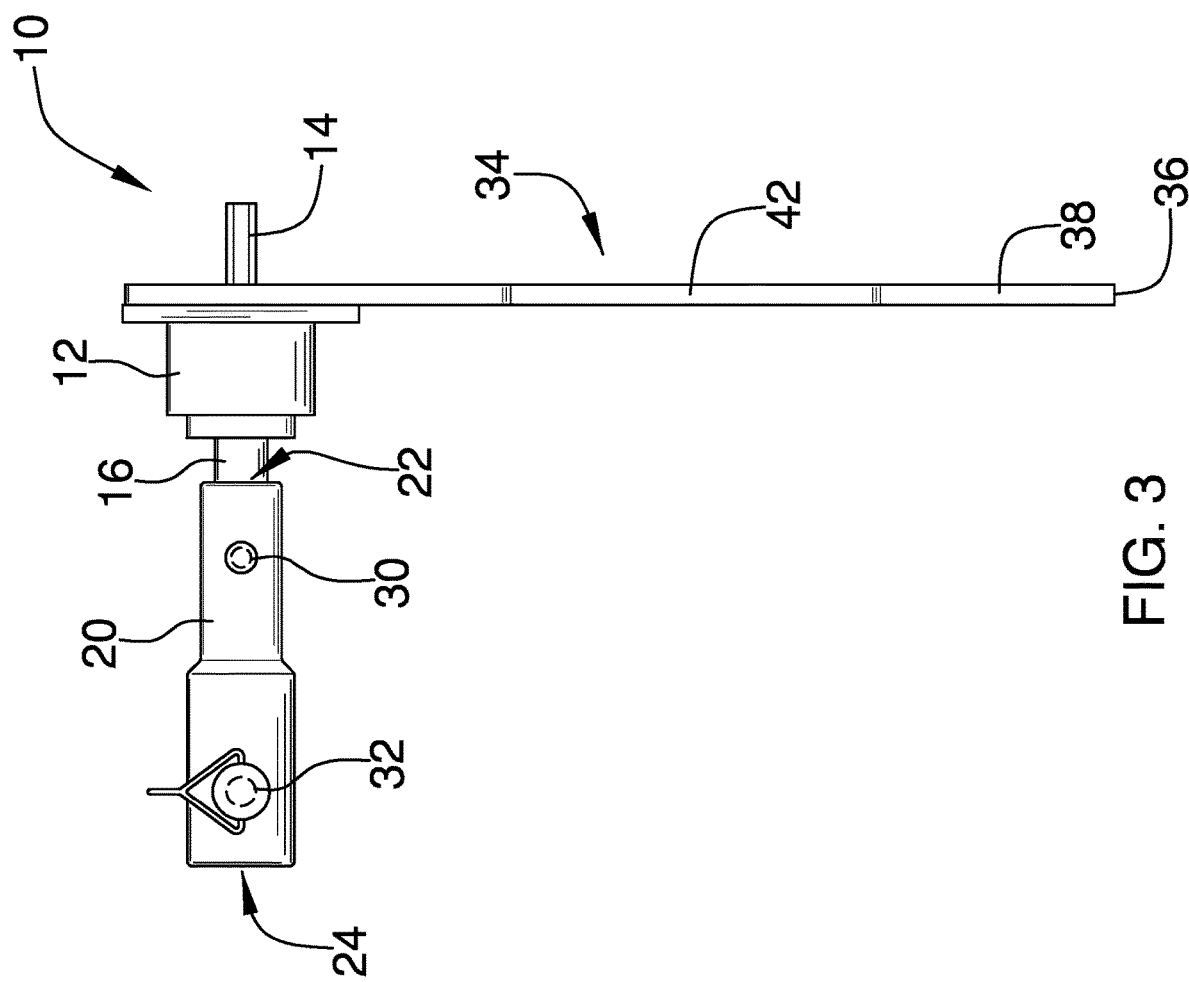
FIG. 3 is a top view of an embodiment of the disclosure.
Figure 4:
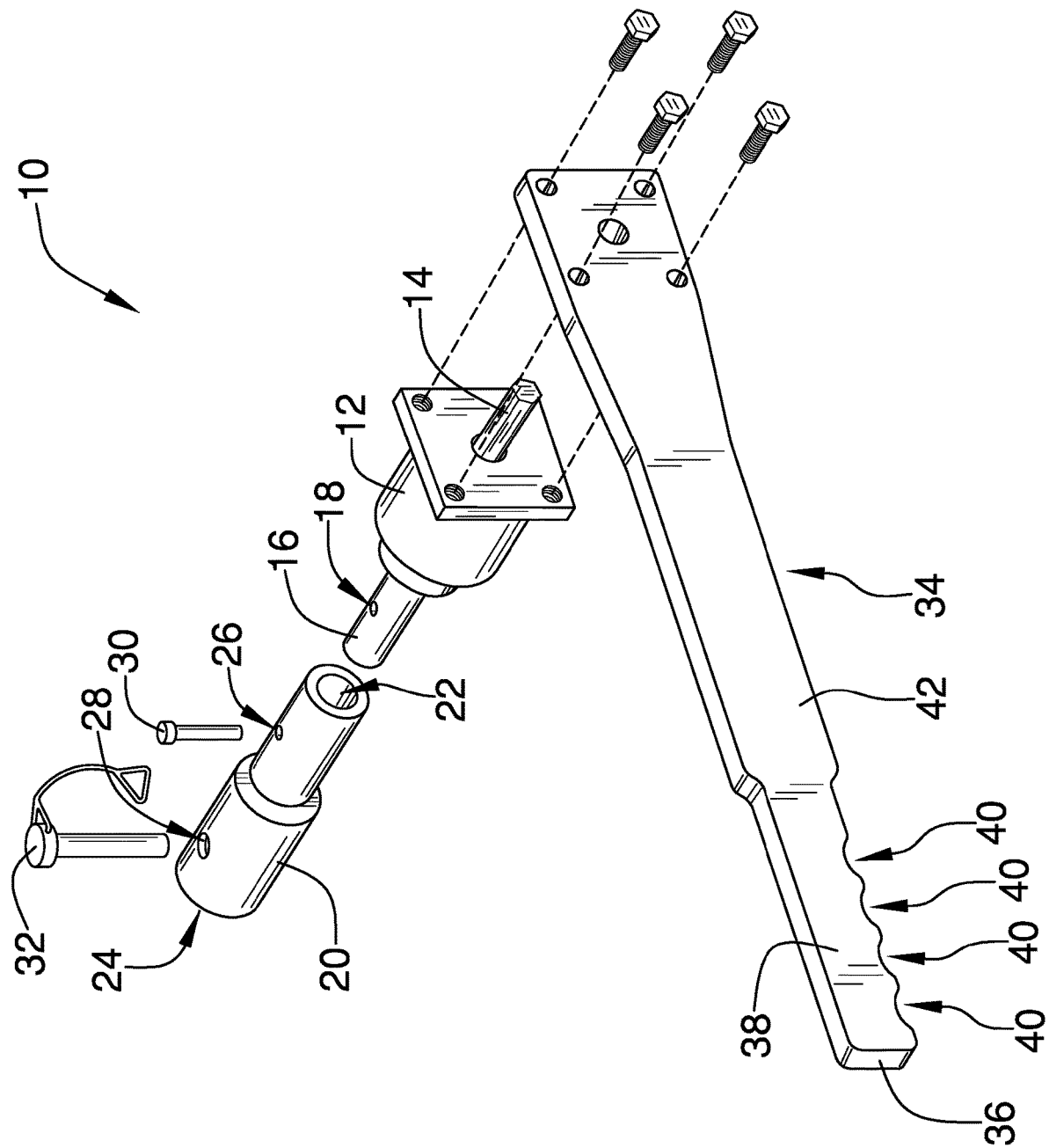
FIG. 4 is an exploded view of an embodiment of the disclosure.
Figure 5:
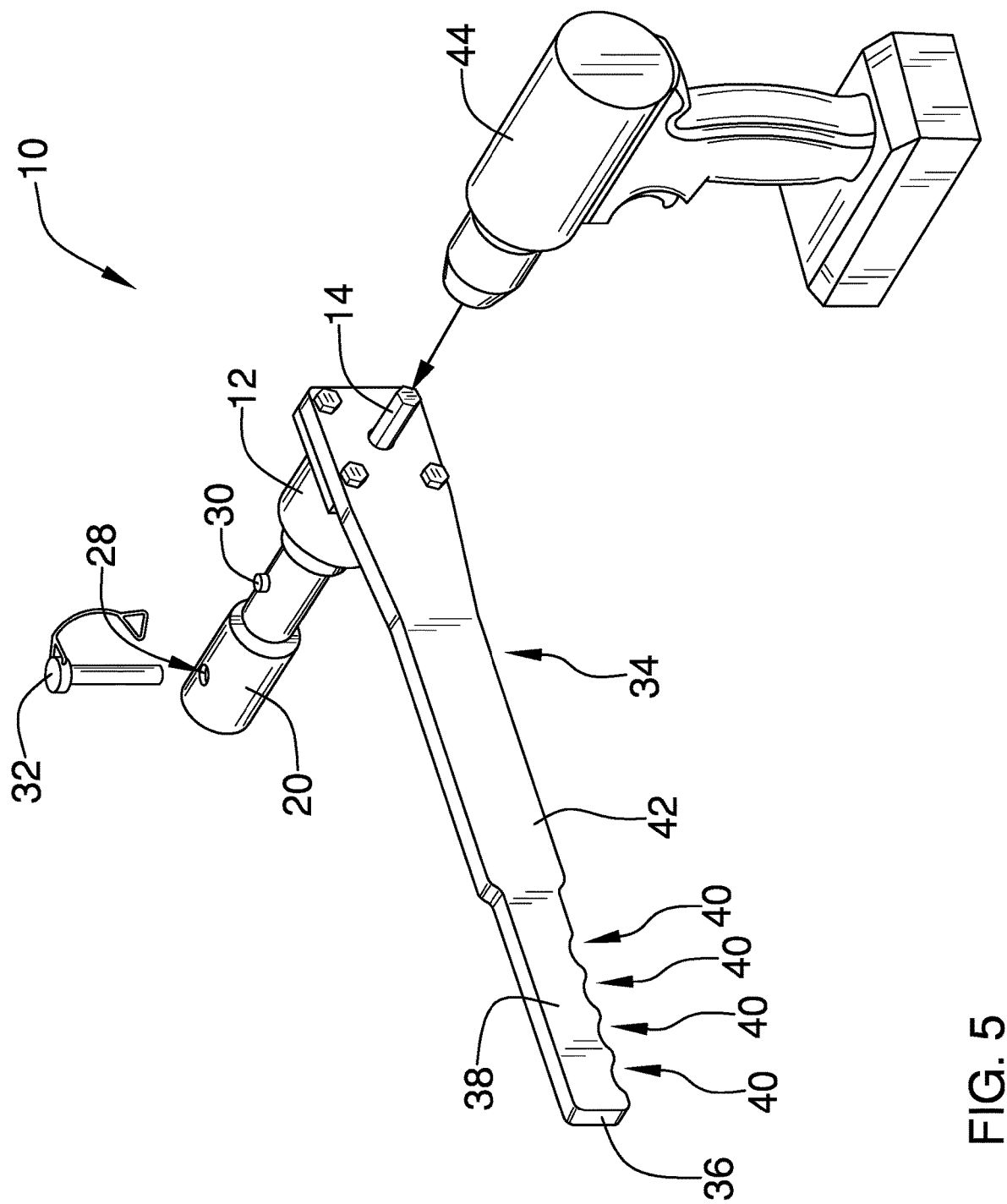
FIG. 5 is a perspective view of an embodiment of the disclosure.
Figure 6:
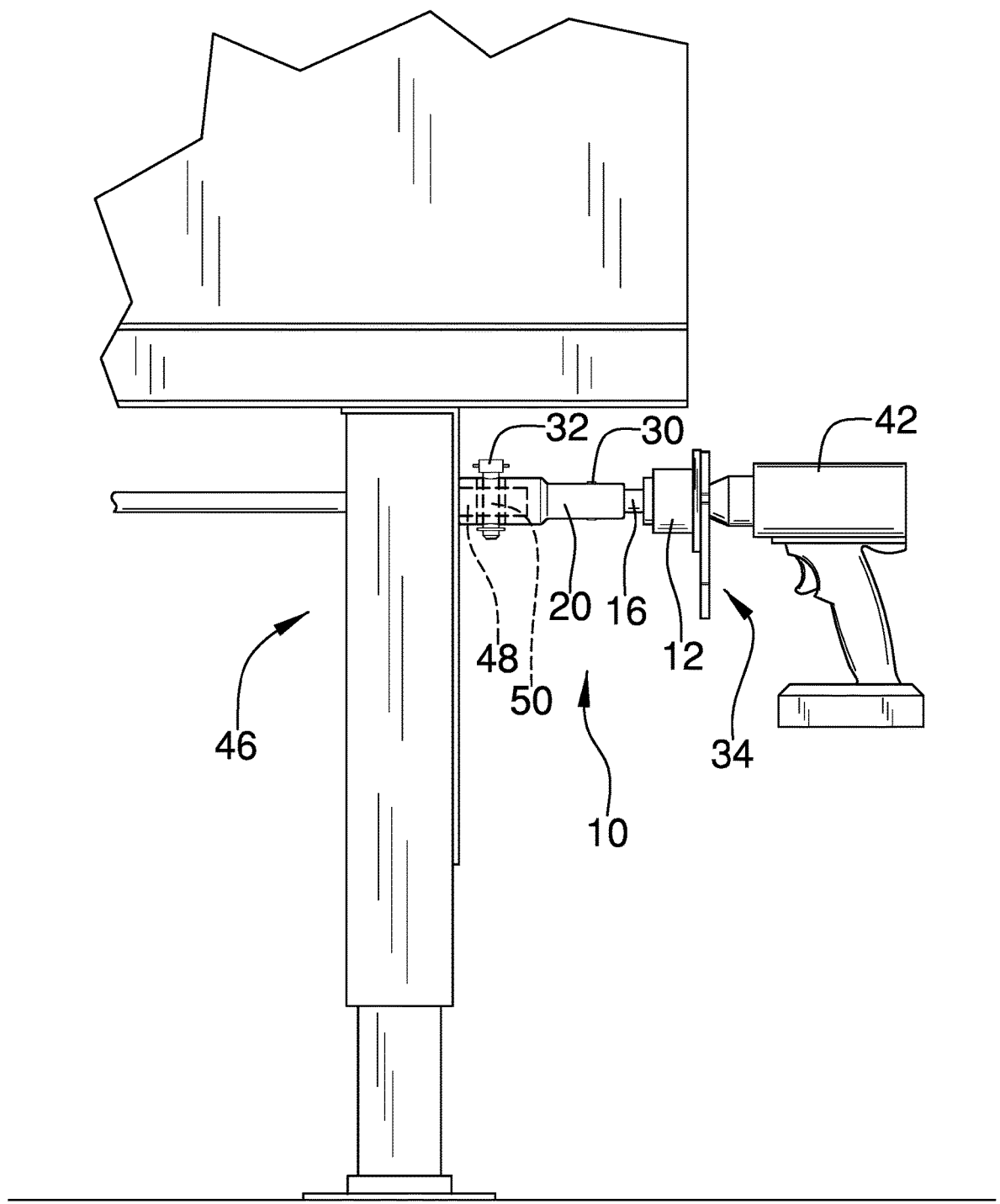
FIG. 6 is an in-use view of an embodiment of the disclosure.

With reference now to the drawings, and in particular to FIGS. 1 through 6 thereof, a new trailer jack adapter embodying the principles and concepts of an embodiment of the disclosure and generally designated by the reference numeral 10 will be described.

As best illustrated in FIGS. 1 through 6, the adapter apparatus 10 generally comprises an inline gear reducer 12 with an input shaft 14 and an output shaft 16 which are aligned with each other along a rotational axis and face opposite directions from each other. The inline gear reducer 12 is configured to urge the output shaft 16 to rotate at a reduced rotational speed compared to an input rotational speed of the input shaft 14, thereby also multiplying a torque applied to the input shaft 14 to produce a larger output torque at the output shaft 16. For example, the speed reduction ratio of the inline gear reducer 12 may be configured to be 3.6:1. The input shaft 14 has a hexagonal cross section taken perpendicular to the rotational axis so that the input shaft 14 may be clamped by a chuck of a rotary drive 44 such as a drill, an impact wrench, or the like. In other embodiments, the cross section of the input shaft 14 may be circular, square, or other shape which may be secured to the rotary drive 44. The output shaft 16 defines a through hole 18 which extends perpendicularly through the output shaft 16.

A connector 20 is removably couplable to the output shaft 16. The connector 20 defines a reducer opening 22 and a jack opening 24 on opposite sides of the connector 20 from each other. The reducer opening 22, which is complementary in shape to the output shaft 16, receives the output shaft 16 of the inline gear reducer 12 when the connector 20 is coupled to the output shaft 16. The connector 20 defines a reducer pin hole 26 which extends transversely through the connector 20 adjacent to the reducer opening 22 and aligns with the through hole 18 of the output shaft 16 of the inline gear reducer 12 when the connector 20 is coupled to the output shaft 16. A reducer connection pin 30 is removably insertable through the reducer pin hole 26 of the connector 20 and the through hole 18 of the output shaft 16 to couple the connector 20 to the output shaft 16. In some embodiments, the connector 20 may be integrally formed or permanently affixed to the output shaft 16. The connector 20 also may releasably couple to the output shaft 16 through a chuck, socket connection, or the like.

The jack opening 24 of the connector 20 has a size and shape such that the jack opening 24 is configured to receive a crank shaft 48 of a trailer jack 46. The connector 20 also defines a jack pin hole 28 which extends transversely through the connector 20 adjacent to the jack opening 24 and is positioned such that the jack pin hole 28 is configured to align with a connection hole 50 of the crank shaft 48 when the jack opening 24 receives the crank shaft 48. A jack connection pin 32 with a size such that the jack connection pin 32 is removably insertable through the jack pin hole 28 of the connector 20 and the connection hole 50 of the crank shaft 48 to couple the connector 20 to the crank shaft 48. Each of the reducer connection pin 30 and the jack connection pin 32 may include retaining clips, detents, or the like to securely couple to the connector 20.

A handle 34 is coupled and extends radially away from the inline gear reducer 12. The handle 34 including a grip 38 adjacent to a distal end 36 of the handle 34 with respect to the inline gear reducer 12. The grip 38 defines a plurality of notches 40 each of which has a size such that the plurality of notches 40 is configured to receive a plurality of fingers of a hand. The notches 40 may be spaced in either of a pair of opposing directions away from a central axis of the handle 34 which extends from the distal end 36 of the handle 34 to the inline gear reducer 12. For example, as depicted in the figures, the notches 40 are spaced in a first direction away from the central axis such that the adapter apparatus 10 is configured for a user to grasp the grip 38 with a left hand while operating the rotary drive 44 against the input shaft 14 with a right hand. If the notches 40 were spaced a second direction opposite the first direction, the adapter apparatus 10 would be configured for grasping the grip 38 with the right hand while operating the rotary drive 44 with the left hand.

A width of the handle 34 taken at the grip 38 may be less than the width of the handle 34 in closer portions 42 of the handle 34 to the inline gear reducer 12 such that the closer portions 42 may resist bending to a greater extent than the grip 38 and the grip 38 is sized to be grasped by a hand of the user. The handle 34 may comprise a metal material such as steel, iron, or the like, or may comprise another suitably rigid and durable material such as high-density polyethylene or the like.

In use, the output shaft 16 is secured to the connector 20 via the reducer connection pin 30 and to the crank shaft 48 via the jack connection pin 32. The grip 38 of the handle 34 is grasped by the user, and the rotary drive 44 is operated while engaging the input shaft 14 of the inline gear reducer 12. As a result, the crank shaft 48 is rotated with a higher torque and slower speed than those of the input shaft 14 of the inline gear reducer 12 to operate the trailer jack 46.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An adapter apparatus for transferring a torque from a rotary drive to a trailer jack, the adapter apparatus comprising:
    an inline gear reducer having an input shaft and an output shaft aligned with each other along a rotational axis and facing opposite directions from each other, the inline gear reducer being configured to urge the output shaft to rotate at a reduced rotational speed compared to an input rotational speed of the input shaft;
    a handle being coupled to the inline gear reducer, the handle extending radially away from the inline gear reducer, the handle including a grip adjacent to a distal end of the handle with respect to the inline gear reducer; and
    a connector being removably couplable to the output shaft, the connector defining a reducer opening and a jack opening on opposite sides of the connector from each other, the reducer opening receiving the output shaft of the inline gear reducer when the connector is coupled to the output shaft, the jack opening having a size and shape such that the jack opening is configured to receive a crank shaft of the trailer jack, the connector being configured to coupled to the crank shaft.

2. The apparatus of claim 1, wherein:
    the output shaft defines a through hole which extends perpendicularly through the output shaft;
    the connector defining a reducer pin hole which extends transversely through the connector adjacent to the reducer opening, the reducer pin hole aligning with the through hole of the output shaft of the inline gear reducer when the connector is coupled to the output shaft; and further comprising a reducer connection pin being removably insertable through the reducer pin hole of the connector and the through hole of the output shaft to couple the connector to the output shaft.

3. The apparatus of claim 1, wherein the reducer opening being complementary in shape to the output shaft.

4. The apparatus of claim 1, wherein the input shaft has a hexagonal cross section taken perpendicular to the rotational axis.

5. The apparatus of claim 1, wherein the grip defines a plurality of notches, each notch of the plurality of notches having a size such that the plurality of notches is configured to receive a plurality of fingers of a hand.

6. The apparatus of claim 1, wherein the connector defines a jack pin hole which extends transversely through the connector adjacent to the jack opening, the jack pin hole being positioned such that the jack pin hole is configured to align with a connection hole of the crank shaft when the jack opening receives the crank shaft, and further comprising a jack connection pin having a size such that the jack connection pin is removably insertable through the jack pin hole of the connector and the connection hole of the crank shaft to couple the connector to the crank shaft.

7. An adapter apparatus for transferring a torque from a rotary drive to a trailer jack, the adapter apparatus comprising:

an inline gear reducer having an input shaft and an output shaft aligned with each other along a rotational axis and facing opposite directions from each other, the inline gear reducer being configured to urge the output shaft to rotate at a reduced rotational speed compared to an input rotational speed of the input shaft, the output shaft defining a through hole which extends perpendicularly through the output shaft, the input shaft having a hexagonal cross section taken perpendicular to the rotational axis;

a handle being coupled to the inline gear reducer, the handle extending radially away from the inline gear reducer, the handle including a grip adjacent to a distal end of the handle with respect to the inline gear reducer, the grip defining a plurality of notches, each notch of the plurality of notches having a size such that the plurality of notches is configured to receive a plurality of fingers of a hand;

a connector being removably couplable to the output shaft, the connector defining a reducer opening and a jack opening on opposite sides of the connector from each other, the reducer opening receiving the output shaft of the inline gear reducer when the connector is coupled to the output shaft, the reducer opening being complementary in shape to the output shaft, the jack opening having a size and shape such that the jack opening is configured to receive a crank shaft of the trailer jack, the connector defining a reducer pin hole which extends transversely through the connector adjacent to the reducer opening, the reducer pin hole aligning with the through hole of the output shaft of the inline gear reducer when the connector is coupled to the output shaft, the connector defining a jack pin hole which extends transversely through the connector adjacent to the jack opening, the jack pin hole being positioned such that the jack pin hole is configured to align with a connection hole of the crank shaft when the jack opening receives the crank shaft;

a reducer connection pin being removably insertable through the reducer pin hole of the connector and the through hole of the output shaft to couple the connector to the output shaft; and a jack connection pin having a size such that the jack connection pin is removably insertable through the jack pin hole of the connector and the connection hole of the crank shaft to couple the connector to the crank shaft.

\* \* \* \* \*